March 10, 1964 G. H. SIEMS 3,124,186
AUTOMATIC SEED POTATO CUTTER
Filed Aug. 3, 1960 5 Sheets-Sheet 1

George H. Siems
INVENTOR.

BY *Clarence A. O'Brien*
*and Harvey B. Jacobson*
Attorneys

March 10, 1964 G. H. SIEMS 3,124,186
AUTOMATIC SEED POTATO CUTTER
Filed Aug. 3, 1960 5 Sheets-Sheet 3
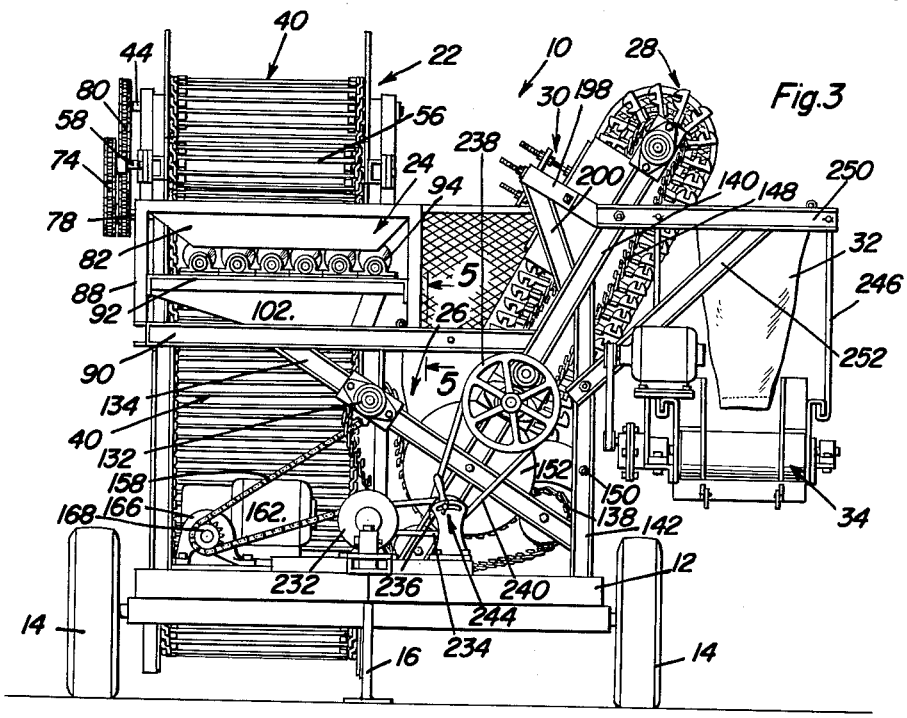
Fig.3
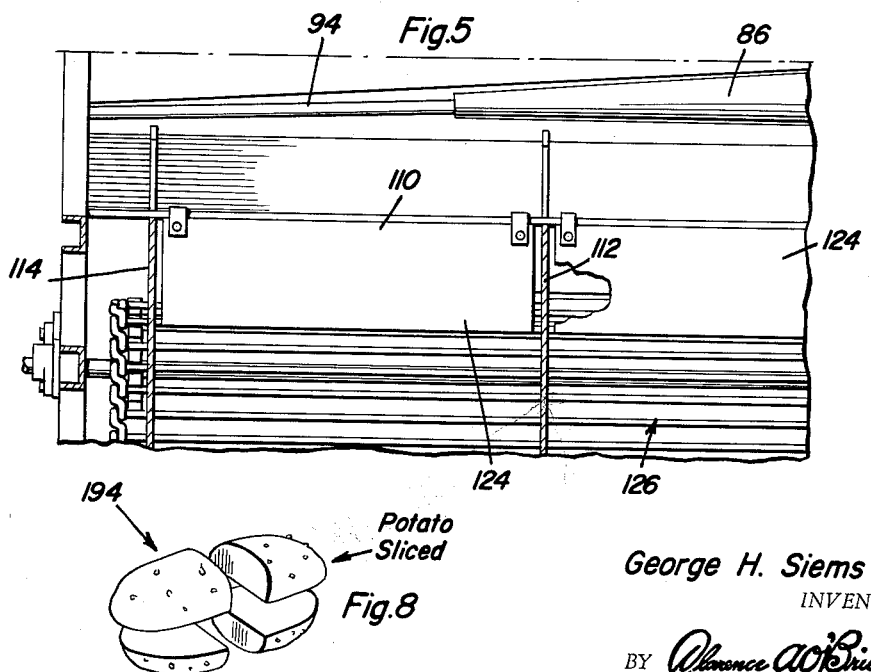
Fig.5
Fig.8
Potato Sliced
George H. Siems
INVENTOR.

March 10, 1964
G. H. SIEMS
3,124,186
AUTOMATIC SEED POTATO CUTTER
Filed Aug. 3, 1960
5 Sheets-Sheet 4
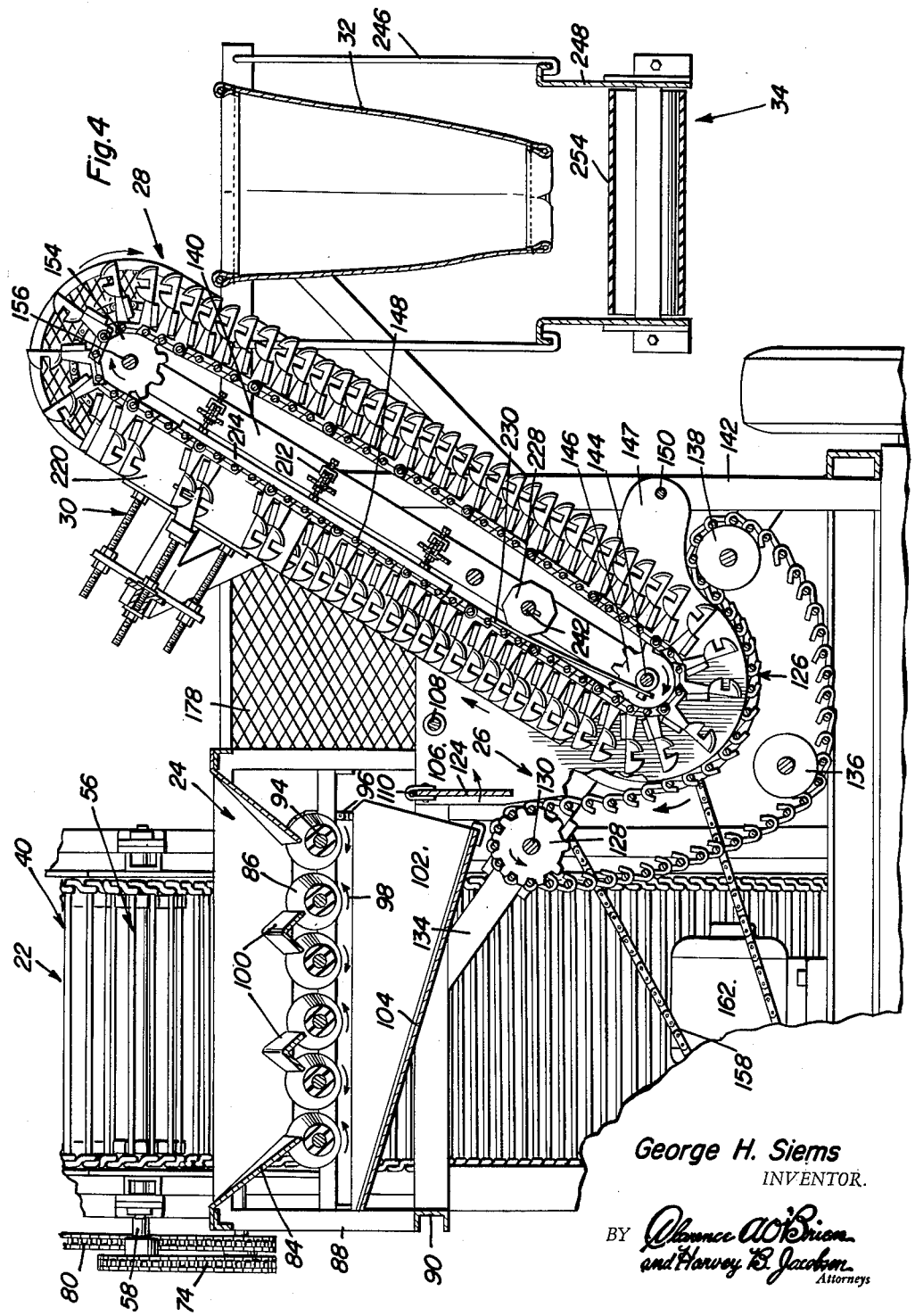
George H. Siems
INVENTOR.

March 10, 1964 G. H. SIEMS 3,124,186
AUTOMATIC SEED POTATO CUTTER
Filed Aug. 3, 1960 5 Sheets-Sheet 5
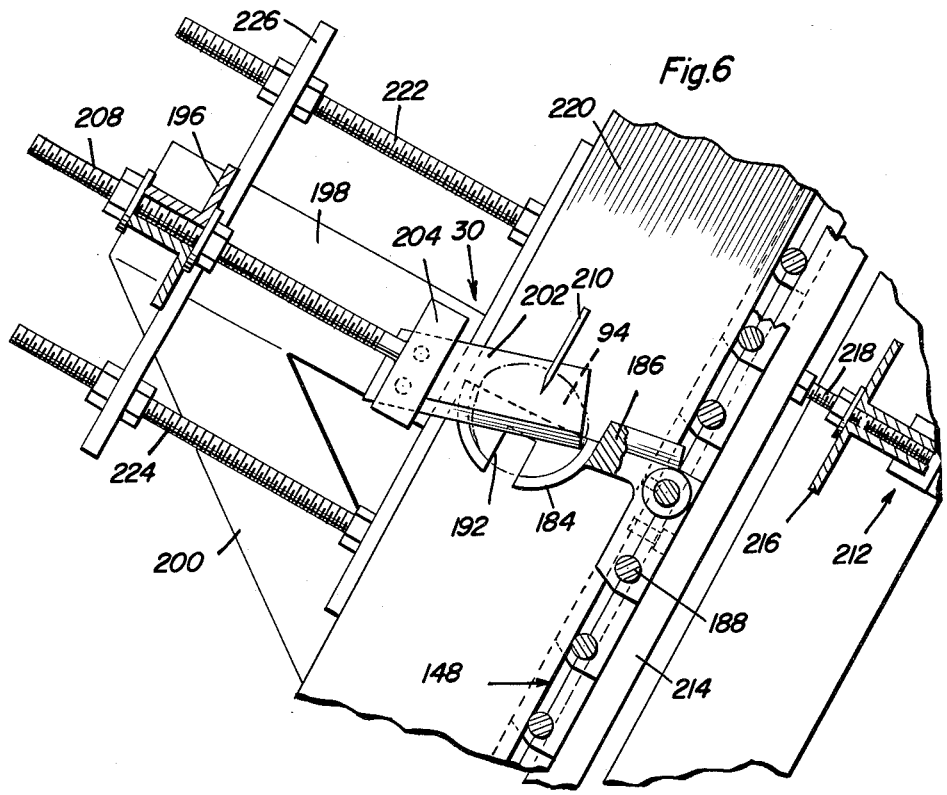
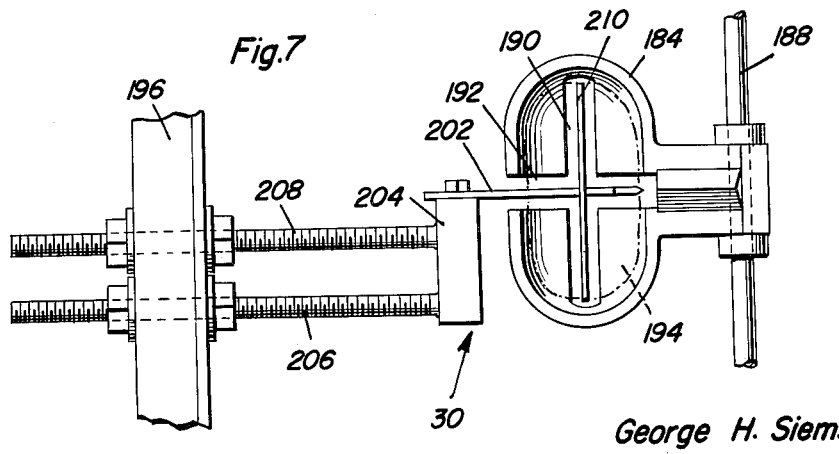
George H. Siems
INVENTOR.
BY *Clarence A. O'Brien*
*and Harvey B. Jacobson*
Attorneys

United States Patent Office 3,124,186
Patented Mar. 10, 1964

3,124,186
AUTOMATIC SEED POTATO CUTTER
George H. Siems, Box 337, Shelley, Idaho
Filed Aug. 3, 1960, Ser. No. 47,250
7 Claims. (Cl. 146—163)

This invention relates to a machine especially designed for automatically sectioning potatoes indiscriminately loaded in to the machine into approximately equal sized potato sections suitable for potato seeding purposes.

It is therefore a primary object of this invention to provide a machine into which potatoes of all sizes may be indiscriminately loaded, the potatoes then being automatically sized by the machine as they pass therethrough to be subsequently segregated into a plurality of size categories, the potatoes in each size category being accordingly sectioned into a number of sections corresponding to the potato size so that all of the sectioned potatoes will be approximately of equal size or within a predetermined size range as they are automatically delivered from the machine.

Another object of this invention in accordance with the foregoing object is to provide an automatic seed potato cutting machine which will rapidly and continuously section potatoes for seeding purposes in a highly efficient manner without bruising or damaging the potatoes.

A further object of this invention in accordance with the foregoing objects is to provide an automatic potato seed cutting machine which is capable of more accurately sectioning the potatoes than is manually possible and is also a tremendous labor-saving device.

An additional object of this invention is to provide an automatic seed potato cutting machine which features a novel loading hopper device for transferring and segregating the potatoes which have been sized onto a conveyor in such a manner as to avoid the bruising and damaging of the potatoes as heretofore commonly experienced with previous seed potato cutting machines.

The machine made in accordance with this invention therefore includes a loading conveyor which delivers the potatoes indiscriminately loaded into a hopper upwardly to one end of a potato sizer device. The potato sizer device is inclined downwardly a slight amount from its potato receiving end so that the potatoes fed onto the sizer may be gently tumbled by the rotating rollers of the sizer toward the other end thereof. The rotating rollers are tapered and disposed parallel to each other to thereby provide a variably increasing space therebetween through which the potatoes may drop as they are moved downwardly along the rollers. It will be appreciated of course that other suitable sizes may be utilized if desired. The potatoes will accordingly fall downwardly from the sizer at points along the sizer corresponding to the potato sizes. The potatoes are received within a transferring hopper device which includes divider walls provided for the purpose of segregating the potatoes sized by the sizer into a plurality of size categories. The bottom of the loading hopper device is defined by an upper run of a curved shaped conveyor which moves in an upward direction so that the potatoes falling from the sizer will be retarded in their downward movement to thereby uniquely condition the segregated potatoes in a state of retarded motion avoiding bruising, crushing or other type of damage to the potatoes when they are picked up therefrom. A second cup-carrying conveyor device extends into the transferring hopper device and the bottom thereof is embraced by the upper run of the first mentioned conveyor so as to confine the potatoes deposited into the transferring hopper device between the two conveyors. The second conveyor accordingly has mounted thereon a plurality of series of cups or containers within which the segregated potatoes are received as the containers move through the transferring hopper device. Because of the retarded or reduced motion of the potatoes within the hopper device, the containers moving therethrough will pick up the potatoes without harm thereto and carry them upwardly out of the loading hopper device. Accordingly, one end series of containers may be constituted by larger buckets for receiving the smaller sized potato so that the second conveyor on which the buckets are mounted may carry them upwardly toward a delivery end without sectioning of the potatoes inasmuch as these smaller potatoes are of such size that they require no sectioning. The other containers on the second conveyor however, may be of a plurality of different sizes and include a different number of slots in the bottoms thereof for accommodating different numbers of sectioning knife blades. In the presently described form of the invention, two series of cups are illustrated including a medium potato size cup for enabling the sectioning of the potato carried therein into two sections and a large potato size cup including perpendicular arranged slots enabling the sectioning of the potato carried therein into four sections. The second conveyor accordingly carries the cups and buckets upwardly with the potatoes therein so that fixedly mounted knife blades may pass through the slots in the cups only to accordingly section the potatoes. Also, the second conveyor has operatively engaged therewith a vibrator mechanism for settling and centering the potatoes within the cups prior to the sectioning thereof. Further, the second conveyor is engaged by fixedly mounted guide means for aligning the conveyor links and cups mounted thereon in accurate alignment with the fixed knife blade for more efficient cutting or sectioning of the potatoes.

The sectioned potatoes within the cups and the small potatoes within the bucket are then carried by the second conveyor upwardly beyond the knife blades and then spilled onto a delivery conveyor from which the potatoes may be dumped into a treating solution to avoid injury due to bruising.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2a is a partial side elevational view of the lower portion of the hopper loading device.

FIGURE 3 is a front elevational view of the machine illustrated in FIGURE 1.

FIGURE 4 is an enlarged sectional view taken through a plane indicated by section line 4—4 in FIGURE 1.

FIGURE 5 is an enlarged sectional view taken through a plane indicated by section line 5—5 of FIGURE 3.

FIGURE 6 is an enlarged partial sectional view illustrating the sectioning knife blade mounting and cup portion of FIGURE 4.

FIGURE 7 is an enlarged top plan view of a portion of the machine illustrating the sectioning knife blade and cup containing the potato.

FIGURE 8 is a perspective view of a sectioned potato sliced by the machine.

FIGURE 9 is a schematic diagram of the drive arrangement for various components of the machine.

Figure 1:
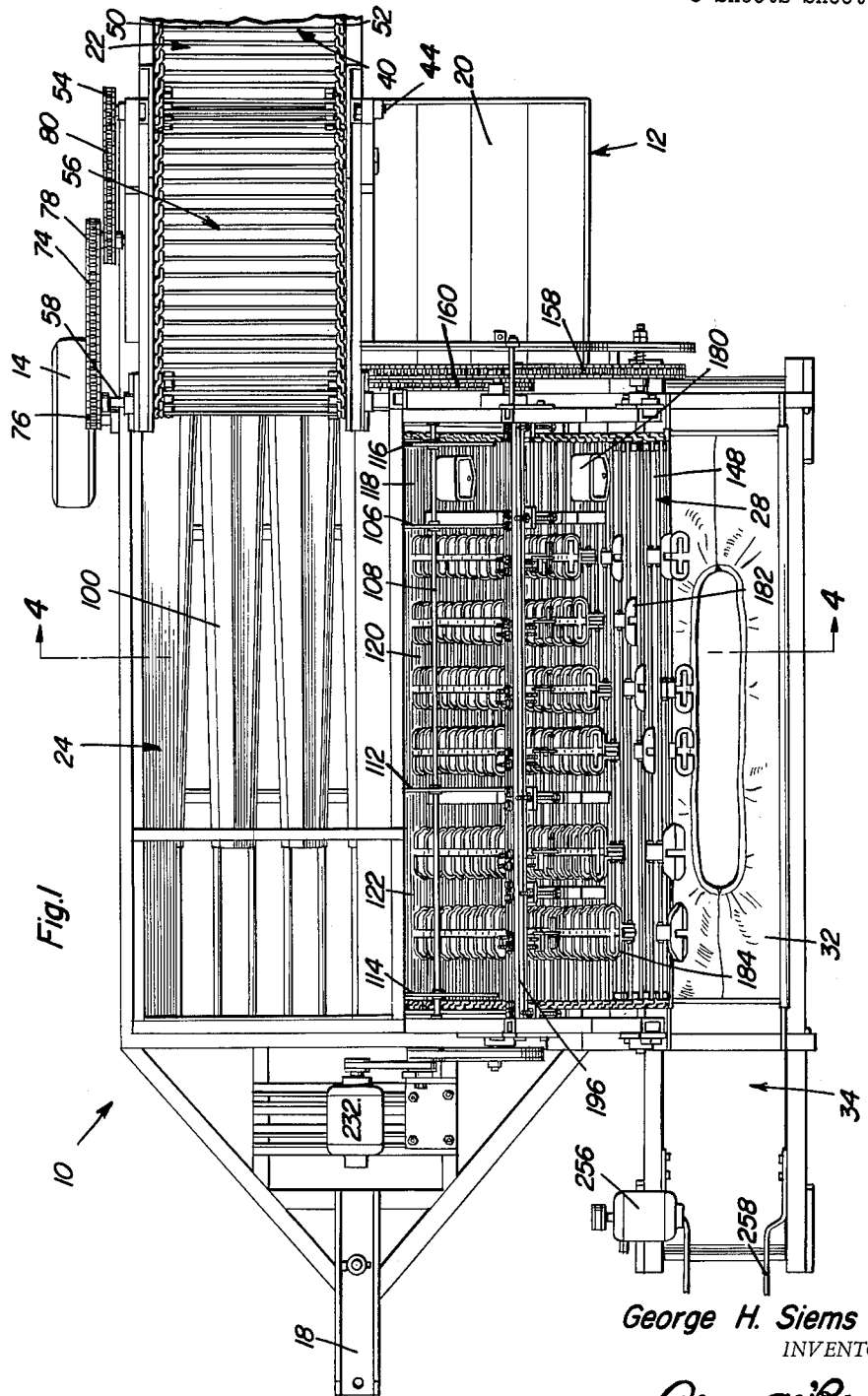
FIGURE 1 is a top plan view of the seed potato cutting machine made in accordance with this invention.

Referring to the drawings in detail, the machine generally indicated by reference numeral 10 is shown mounted on a wheeled frame generally indicated by reference numeral 12 which includes a pair of wheel assemblies 14. The forward end of the wheeled frame 12 has connected thereto a supporting standard 16 for anchoring the wheeled frame 12 in position and a connecting member 18 by means of which the machine 10 may be transported to different locations.

Figure 2:
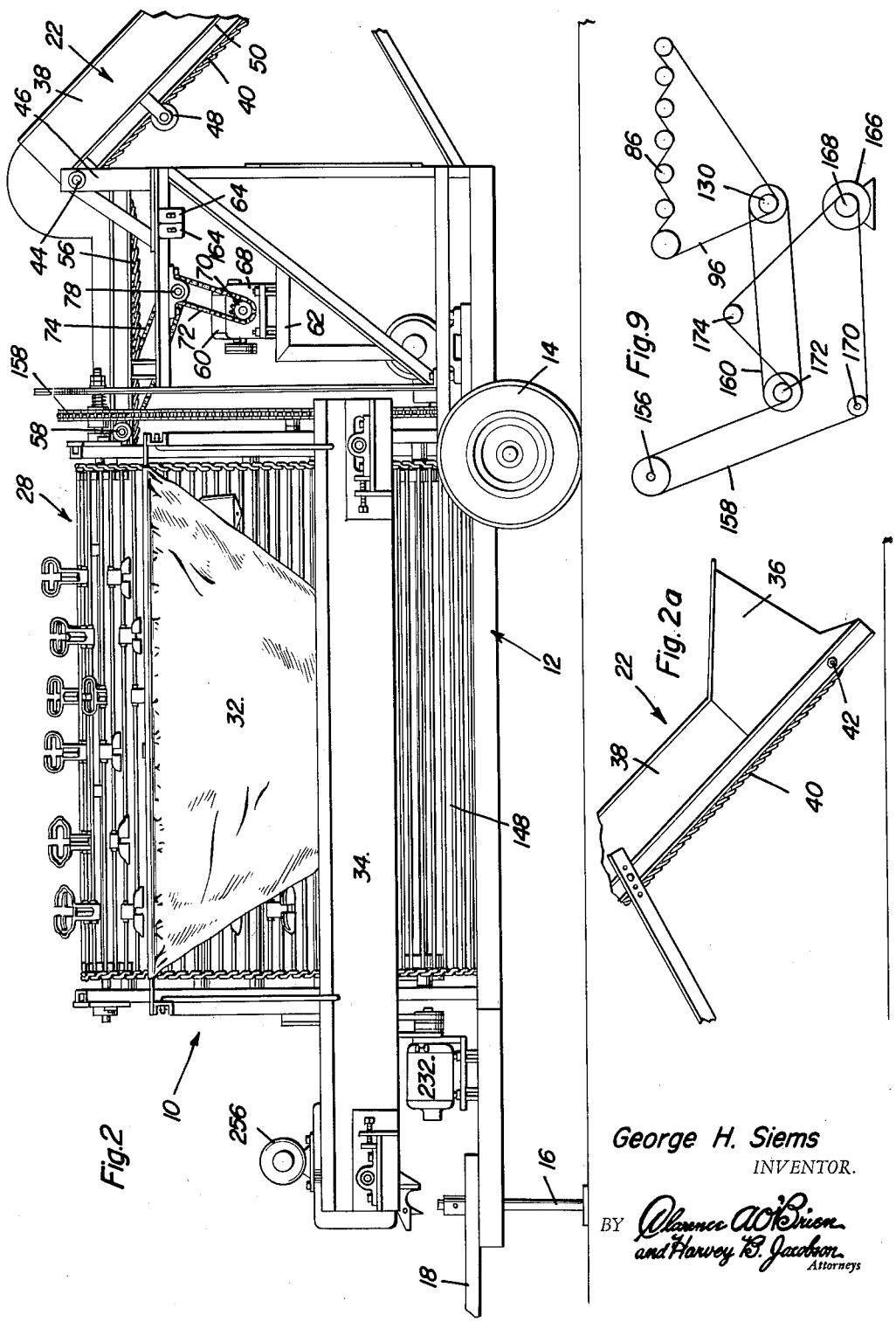
FIGURE 2 is a side elevational view of the machine illustrated in FIGURE 1.

In FIGURES 1, 2 and 3 it will also be observed that the machine 10 is mounted on a top platform 20 of the wheeled frame 12, the machine 10 including a potato loading device generally indicated by reference numeral 22 into which the potatoes are loaded. The loading device 22 is disposed rearwardly of the machine at one side thereof and extends rearwardly therefrom overhanging the wheeled frame 12. The potatoes are therefore deposited by the device 22 onto a potato sizer device generally indicated by reference numeral 24 which is disposed longitudinally across the frame on the same side thereof as the loading device 22, one end of the sizer device 24 underlying the delivery end of the loading device as more clearly seen in FIGURE 1.

Referring now to FIGURES 3 and 4, it will be apparent that the potatoes drop down from the sizer rollers 86 and are delivered from the inner side of the sizer 24 into a hopper transferring device generally indicated by reference numeral 26. A conveyor device generally indicated by reference numeral 28 extends upwardly at an angle from the hopper device 26 toward a lateral side of the wheeled frame 12 oposite the sizer device 24. Accordingly, the potatoes are picked up from the device 26 and carried through a sectioning knife device generally indicated by reference numeral 30 as seen in FIGURE 3. The potatoes after being sectioned by the sectioning knife device 30 are spilled out into a canvas chute 32 supported by the wheeled frame 12 and extending cantilever fashion beyond a lateral side thereof as more clearly seen in FIGURE 3. The potatoes are then deposited upon a horizontal conveyor generally indicated by reference numeral 34 which carries the sectioned potatoes to a delivery point forwardly of the wheeled frame 12 off to one lateral side thereof as more clearly seen in FIGURE 1.

Referring now to FIGURES 1, 2 and 2a it will be observed that the potato loading device 22 is mounted by a supporting structure carried by the wheeled frame 12 and is supported cantilever fashion therefrom with a lower end or hopper portion 36 disposed rearwardly of the wheeled frame 12 just above the ground so that potatoes may be loaded into the hopper portion 36, as more clearly seen in FIGURE 2a. The hopper portion 36 is connected to an upwardly inclined delivery chute 38 the bottom of which is formed by an endless conveyor link belt 40 which extends between idler wheels mounted on a transverse shaft member 42 disposed within the bottom of the hopper portion 36 and drive sprockets on a sprocket shaft 44 rotatably mounted by a pair of frame members 46 to which the upper end of the delivery chute 38 is connected as more clearly seen in FIGURE 2. The bottom run of the endless link belt 40 is guided by rollers 48 which are mounted on a pair of frame members 50 to which the delivery chute 38 and hopper portion 36 are connected. As will be more clearly seen in FIGURE 1, the conveyor link 40 is composed of a plurality of link members 51 the outer ends 52 of which are interlinked with the upper adjacent link member 51 in order to form the endless belt 40. The interconecting link portions 52 of the link members 51 are engaged by the sprocket wheels mounted on the drive shaft 44 for driving the endless conveyor belt 40. Accordingly, a drive sprocket wheel 54 is connected to the outer end of the sprocket drive shaft 44 for moving the conveyor belt 40 in such a direction that the upper run thereof will move upwardly to carry the potatoes loaded into hopper portion 36 upwardly to a delivery end which is disposed above a second endless conveyor belt 56 which is similar in construction to the conveyor belt 40. The conveyor belt 56 is however disposed in a horizontal position with the right end thereof as viewed in FIGURES 1 and 2 being disposed beneath the upper delivery end of the conveyor belt 40 while the other end of the conveyor belt 56 is disposed above one end of the sizer device 24. It will also be observed that the receiving end of the conveyor belt 56 is trained about an idler sprocket while the delivery end thereof is trained about a driving sprocket mounted on a driving sprocket shaft 58. Referring therefore to FIGURE 2 it will be observed that a motor 60 is mounted on a supporting frame 62 which is mounted on the wheeled frame 12, the motor 60 being controlled by means of a switch 64 and driving through a gear reducer 66 the driven sprocket wheel 70. The sprocket wheel 70 drives a sprocket chain 72 which in turn drives an idler sprocket wheel which is drivingly conected to an endless sprocket chain 74 as also seen in FIGURE 1, which is trained about the sprocket wheel 76 connected to the driving sprocket shaft 68 for the horizontal endless conveyor belt 56. The intermediate sprocket shaft 78 by means of which the sprocket chain 74 is driven also has connected thereto a second sprocket wheel for driving the sprocket chain 80 which is drivingly connected to the sprocket wheel 54 for driving the sprocket drive shaft 44 in order to drive the endless link belt 40. Accordingly, the motor 60 controlled by the switch 64 is drivingly connected to the conveyor belts 40 and 56 for the purpose of operating the potato loading device 22.

Referring now to FIGURES 1 and 4 in particular, it will be observed that the delivery end of the horizontal conveyor 56 of the loading device 22 is disposed above one end of the sizer device 24 as herein before indicated. The sizer device therefore includes an inlet chute 82 as seen in FIGURE 3 which includes inwardly and downwardly inclined sides 84 as more clearly seen in FIGURE 4. Disposed beneath the inlet chute 82 are a plurality of tapered rollers 86, six of which are illustrated. It will be observed that the inlet chute 82 of the sizer device 24 is mounted by means of a frame 88 which is mounted on a horizontal cross suporting member 90 while a cross mounting member 92 is disposed between the outer and inner sides of the frame 88 for supporting a plurality of journal brackets 94 as more clearly seen in FIGURE 3. The journal brackets 94 rotatably support each of the tapered rollers 86. The rollers 86 are therefore rotatable about the axis of roller shafts 94 which are disposed parallel to each other and are arranged parallel to the longitudinal axis of the wheeled frame 12. Accordingly, the larger diameter ends of the rollers 86 are disposed toward the rear portion of the wheeled frame 12 just beneath the delivery end of the horizontal conveyor portion 56, as more clearly seen in FIGURE 1. The smaller diameter end of the tapered rollers 86 are therefore located closer to the forward end of the wheeled frame 12. Also, as will be apparent from FIGURE 4, the roller shafts 94 and hence also the tapered rollers 86 are slightly inclined downwardly toward their smaller diameter ends so that potatoes deposited from the delivery end of the conveyor 56 may tumble downwardly toward the smaller diameter end of the sizer device 24. It will also be observed from FIGURE 4, that the tapered rollers 86 are rotated by means of an endless chain 96 in such a maner that adjacent rollers are rotated in opposite directions to each other as indicated by the arrow 98 in FIGURE 4.

In conjunction with the rotational directions of the rollers 86, baffle members 100 are provided above alternate adjacent rollers for the purpose of deflecting potatoes away from the space between those sides of the adjacent rollers with which the baffle members 100 cooperate. Accordingly, the baffle members 100 as will be apparent in FIGURE 4 prevents potatoes from becoming wedged between the spaces between adjacent rollers the sides of which are rotating in a downward direction which would otherwise cause the potatoes to become wedged therebetween. The baffle members 100 therefore leave exposed the spaces between the rollers on those sides thereof in which the rollers are moving in an upward direction so that the rollers tend to bounce or tumble the potatoes which come in contact with the roller sides. Also, connected to the cross frame member 92 is a delivery chute member 102 which has a downwardly inclined bottom wall 104 arranged to deliver the potatoes dropped through the spaces between the tapering rollers 86 downwardly toward an inner side centrally disposed with respect to the frame 12 but vertically spaced thereabove for depositing the potatoes onto the loading hopper device 26.

It will therefore be recognized that the potatoes of various sizes dropping onto the sizer 24 at the larger diameter ends of the tapered rollers 96 thereof are prevented from being wedged between the rollers 86 by means of the deflecting baffle members 100 which guides the potatoes over the sides of the roller moving in an upward direction so as to tumble the potatoes, the potatoes thereby tumbling downward toward the smaller diameter ends of the tapered rollers 86 inasmuch as the roller shaft 94 are inclined slightly downwardly as more clearly seen in FIGURE 5. The potatoes as they move downwardly along the tapered roller 86 will pass through and fall between the progressively increasing space between the rollers when said space exceeds the dimensional extent of the potato. Accordingly, the very small potatoes will drop to the bottom 104 of the delivery chute 102 of the sizer device 24 close to the larger diameter end of the tapered rollers while the larger potatoes will fall through the sizer tapered rollers adjacent to the smaller diameter ends thereof or the forward end of the machine. Accordingly, the potatoes will be delivered from the sizer chute member 102 in positions longitudinally along the sizer device 24 corresponding to the size of the potatoes for reception by the loading hopper device 26 which is disposed beneath and along the lower delivery end of the sizer chute member 102.

Referring therefore to FIGURES 4 and 5 it will be observed that the transferring hopper device 26 includes a plurality of dividing walls which are mounted on longitudinal mounting pins 108 and 110 connected to the horizontal supporting frame member 90. The dividing walls are provided for the purpose of segregating the potatoes falling into the hopper device into different size ranges or categories as will be observed in FIGURE 1. The longitudinal supporting pin 108 which is visible from above as seen in FIGURE 1 therefore supports dividing walls 106, 112 and two outer side walls 114 and 116. Accordingly, the hopper device 26 is divided into three spaces or chambers including a small potato chamber 118 disposed between the side walls 116 and partition wall 106, a medium potato chamber 120 disposed between the wall 106 and the wall 112 and a larger potato chamber 122 disposed between the dividing wall 112 and the side wall 114. It will of course be appreciated that the hopper device 26 may be divided into a different number of chambers and also into chambers of differing spatial extent than that illustrated in FIGURE 1 depending upon the requirements. It will also be observed in FIGURES 4 and 5 that a gate flap member 124 is hingedly mounted on the pin 110 within each of the hopper device chambers, the extent of the gate flap 124 being of course of such dimension in order to accommodate the spatial extent of the chamber with which it is associated. Accordingly, the potatoes will be deposited from the delivery end of the sizer device chute member 102 into the appropriate chamber of the loading hopper device, each chamber thereby receiving only potatoes falling within a predetermined size range.

An endless link type conveyor belt generally indicated by reference numeral 126 is therefore provided in order to form the bottom of the transferring hopper device 26. Accordingly, the upper run of the conveyor 126 constitutes the bottom and one side of the hopper device 26 as will be more clearly seen in FIGURE 4. The conveyor 126 is constructed of a plurality of link members in a manner similar to the construction of the link conveyors 40 and 56 hereinbefore described. The conveyor 126 however is necessarily of greater extent than the conveyors 40 and 56 inasmuch as the width of the conveyor 126 extends substantially along the entire longitudinal side of the sizer device 24. The conveyor device 126 is therefore supported by a pair of drive sprockets 128 disposed at an upper end of the conveyor 126 just beneath the delivery end of the bottom wall 104 of the sizer delivery chute 102. The drive sprockets 128 are therefore rotatably mounted on a drive sprocket shaft 130 which is rotatably mounted on mounting bracket member 132 adjustably mounted on frame members 134. The curved shape of the conveyor 126 is maintained by a pair of idler wheel assemblies 136 and 138 as seen in FIGURE 4. Also, the conveyor 126 is rotated in such a direction as indicated by the arrow in FIGURE 4 so as to move the upper run of the conveyor 126 in an upward direction. Accordingly, potatoes dropping onto the bottom of the loading hopper device 26 will contact the upper run of the conveyor 126 which thereby retards the downward movement of the potatoes which are thereby in a retarded movement condition so as to avoid bruising and damaging to the potatoes when they are picked up by the conveyor device 28.

Referring now to FIGURE 3, it will be observed that the frame member 134 by means of which the drive sprocket shaft 130 and the idler wheel 138 are rotatably mounted is intersected by and connected to a frame member 140 which is also connected to a vertical frame member 142 for the purpose of supporting the conveyor device 28. At the intersection of the frame members 134 and the conveyor frame member 140 there is provided a sprocket shaft 144 upon which a pair of sprocket wheels 146 are mounted for drivingly engaging a lower end of a link type conveyor belt 148 of the conveyor device 28 which is similar in construction to the previously described link conveyor belts. It will therefore be observed that the lower end of the conveyor device 28 is disposed within the loading hopper device between the side walls 114 and 116 thereof which side walls have projecting extensions 147 for fastening the side walls to the vertical side frame members 142 by means of fasteners 150. The sprocket engaging ends of the link conveyor 148 are therefore disposed on the outside of the side walls 114 and 116 for engagement with the sprocket wheels 146 and are protected by the rotor disks 152 which are mounted on the sprocket drive shaft 144 and which disks also engage the link ends of the top run of the conveyor belt 126 for maintaining said top run in proper spaced relation relative to the lower end of the conveyor device 28.

The supporting frame member 140 of the conveyor device also has rotatably mounted at an upper end thereof a pair of driving sprockets 154 which are rotatably mounted by means of sprocket drive shaft 156. It will therefore be observed that the conveyor device 28 is driven by means of the upper sprocket wheels 154 through the drive shaft 156 from one side thereof by means of the sprocket chain 158 as seen in FIGURES 1 and 2.

A drive mechanism is therefore provided for driving the conveyor belt 126 and conveyor belt 148 as well as the sprocket chain 96 for the tapered rollers 86 of the sizer device 24 in the proper directions. Referring therefore to FIGURES 9, 1 and 3 it will be observed that the drive mechanism for the conveyors 126 and 148 and the sizer rollers is disposed on the rearward side of the machine 10 and includes a motor 162 which is controlled by the second switch device 164 as seen in FIGURE 2. The electric motor 162 is connected by means of a gear reducer 166 as seen in FIGURE 3 to the conveyor and the sizer rollers by means of the sprocket chain 158. Referring therefore to FIGURE 9 it will be observed that the sprocket drive chain 158 extends between the front sprocket wheel 168 driven by the gear reducer 166 about an idler wheel 170 and upwardly about the upper drive sprocket wheel connected to drive shaft 156 to drive the conveyor belt 148. The sprocket chain 158 then extends downwardly from the sprocket drive shaft 156 about an intermediate sprocket 172, an idler wheel 174 and back to the drive sprocket 168. Connected to the intermediate sprocket 172 is a sprocket chain belt 160 which is drivingly engaged with a sprocket drive shaft 130 by means of which the conveyor belt 126 is driven as well as the endless sprocket chain 96 for rotating the tapered sizer rollers 86 in opposite directions. From FIGURES 3 and 4 it will be observed that the drive mechanism described hereinabove is protected by means of a wire mesh 178. Accordingly, both the conveyors 126 and 148 are driven in an upward direction with respect to each other as shown by the arrows in FIGURE 4 while the tapered rollers 86 are driven in opposite directions as hereinbefore indicated.

It will be observed from FIGURES 1 and 4, that a plurality of series of potato receiving cups and buckets are connected to the links of the conveyor belt 148 of the conveyor device 28. Accordingly, spaced bucket members 180 are connected to the link members of the chain belt 148 in alignment with the chamber 118 formed between the walls 106 and 116 of the loading hopper device 26 into which the lower end of the conveyor device extends as seen in FIGURE 1. Also, a plurality of intermediate sized cups 182 are connected to the link members in vertically spaced relation to each other between the dividing walls 106 and 112 of the loading hopper device 26 while the large potato size containing cups 184 are disposed between the side wall 114 and partition dividing wall 112 of the hopper device 26. Accordingly, the cups are moved down into the bottom of the hopper device 26 for scooping the potatoes contained within the hopper device 26 and carry them upwardly to the upper end of the conveyor device 28 for delivery into the delivery chute canvas 32. Referring therefore to FIGURES 6 and 7 it will be observed that each cup 184 for example is clamped by means of a mounting bracket 186 to the link members 188 of which the conveyor belt 148 is constructed. It will be observed that the mounting bracket 186 connects each of the cups 184 to two adjacent link members 188. It will also be observed that the cup 184 includes a slot 190 on the bottom of the cup 184 disposed parallel to the link members 188 and arranged perpendicular to the intersecting slot 192 which is disposed parallel to the direction of movement of the conveyor belt 148. Accordingly, the cups are moved past the sectioning knife device 30 for the purpose of slicing a potato 194 being carried by each cup 184. It will of course be appreciated that the intermediate size cups 182 are similar as far as the connection of the cup to the link members 188 are concerned but are smaller in size and need not include the slot 190 illustrated inasmuch as a potato carried therein would be sliced only into two sections.

It will therefore be apparent that the sectioning knife device 30 includes a plurality of knife blades adjustably mounted on a transverse frame member 196 as seen in FIGURE 1, which is supported by and connected to frame members 198 extending perpendicular to the conveyor frame member 140 and are braced by bracing members 200. Accordingly, the cross member 196 adjustably supports the knife blades each of which is aligned with a different series of cups 182 or 184. The buckets 180 on the other hand which receive the smallest potatoes deposited onto the hopper device 26 merely carry the potatoes upwardly toward the upper delivery end of the conveyor device 28 without cutting of the potatoes since the potatoes are within such a range size corresponding to the desired size of potatoes sections for seeding purposes. It will be observed however that corresponding to each series of cups 182 and 184 a knife blade will be fixedly mounted in order to pass through the slots in the cups for slicing a potato being carried within the cup. Referring once again to FIGURES 6 and 7 therefore, it will be observed that a knife blade 202 is mounted for passage through the slots 192. The knife blade 202 is therefore connected to a mounting bracket 204 which is adjustably positioned on the cross member 196 by means of a pair of threaded screw members 206 and 208. The cross member 196 is also adjustably positioned above the conveyor belt 148 by means of an adjustable screw member 203 as seen in FIGURE 6. It will also be apparent that only in the case of the cup 184 is a second blade 210 connected to the rearward portion of the blade 202 so that it may pass through the other slot 190 in the cup 184 to thereby section the potato 194 contained within the cup 184 into four sections as seen in FIGURE 8.

It will however be appreciated that in view of the flexible nature of the conveyor belt 148, guide means will be necessary in order to more rigidly align the cups connected to the links 188 of the link belt 148 in order to properly align the sectioning blade with the slot in the cup. Referring therefore to FIGURES 4 and 6 in particular, it will be observed that a plurality of adjustable positioning devices 212 are connected to the conveyor supporting frame 140, said positioning devices 212 thereby mounting a guiding rail member 214 beneath the link member 188 of the conveyor belt 148. Referring therefore to FIGURE 6, it will be observed that each of the positioning devices 212 includes a bracket 216 extending perpendicular to the supporting frame 140 which threadedly positions the screw member 218 for adjustably moving the guide rails 214 toward or away from the link members 188 of the conveyor belt 148. Also, guiding board rails 220 are disposed above the link members 188 of the conveyor belt 148 so that the link members will be guided between the upper guide rails 220 and lower guide rail 214. The upper guide board rail 220 is therefore adjustably positioned by means of a pair of screw members 222 and 224 connected thereto, said screw members being threadedly positioned relative to a member 226 connected to the cross member 196. Accordingly, lower guiding rails 214 and upper guiding rails 220 are adjustably positioned longitudinally along the cross frame member 196 disposed above the conveyor belt 148 and between the cups connected to the conveyor belt 148 so as to rigidly guide the conveyor link members 188 as the cups are drawn past the fixed blade of the blade device 30.

It will also be appreciated that prior to the slicing of the potatoes by the fixed blade device 30 the potatoes must be settled and centered within the cups in order to assure a uniform sectioning thereof. Accordingly, as seen in FIGURE 4 a cam element 228 is rotatably mounted by the conveyor frame 140 and is engageable with a resilient follower arm 230 which abuts against the underside of the link members 188 of the conveyor belt 148 of the conveyor device 28. Accordingly, as the cam element 228 is rotated it will vibrate the follower arm 230 anchored to the frame at its other end so as to vibrate the link members. It will therefore be appreciated that as a result of such vibration of the conveyor device 28, the potatoes received within the cups will be settled and centered therein for proper slicing thereof. The drive mechanism for the cam element 228 is therefore more clearly seen in FIGURE 3 and includes an electric motor 232 which is belt connected by means of belt 234 to a pulley 236 which in turn is drivingly connected with a pulley wheel 238 by means of a second belt 240. The pulley wheel 238 is therefore connected to the cam element 228 by means of cam shaft 242. As also seen in FIGURE 3, a belt tightener device 244 is provided in order to adjustably position the drive pulley 236 for tensioning of the belt 240 to controllably operate the vibratory cam drive element 228.

From the foregoing, it will be apparent that the sliced potatoes will be spilled out of the cups and buckets as they traverse the upper end of the conveyor device 28, the potatoes spilling onto the horizontal conveyor 34 through the canvas chute 32. As seen in FIGURE 3, the delivery conveyor device 34 is mounted by suspension members 246 from which the conveyor frame 248 hangs. The suspension members are suspended from horizontal frame members 250 which extend from and are connected to the frame 140 of the conveyor device 28 and are braced by means of brace members 252. The delivery conveyor device 34 therefore also includes an endless belt 254 which is driven by an electric motor 256 mounted on the conveyor device frame adjacent the forward end of the machine 10 as seen in FIGURES 1 and 2. Accordingly, the potatoes after being sliced are dropped onto the conveyor belt 254 and moved forwardly relative to the machine to a delivery end of the conveyor device 34 which includes the guiding outlet members 258 as more clearly seen in FIGURE 1.

From the foregoing description, operation of the automatic potato seed cutting machine and its utility will be apparent. Summarizing its operation, however, it will be apparent that the potatoes of various sizes may be indiscriminately loaded into the hopper portion 36 at the lower end of the loading device 22. The potatoes will then be carried upwardly by the loading device 22 on its conveyor belt 40 and deposited on a horizontal conveyor belt 56 by means of which the potatoes are deposited at one end of the sizer device 24. The sizer device is downwardly inclined so that the potatoes will be dropped without damage into the size separating chambers of the hopper device 26 defined by the dividing walls thereof to thereby segregate the sized potatoes into different size categories. Accordingly, the smaller potatoes deposited within chamber 118 of the hopper device 26 are picked up by the buckets 180 on the conveyor device 28 while the medium sized potatoes are picked up by the cups 182 from chamber 120 and the larger sized potatoes are picked up by cups 184 from the chamber 122 of the hopper device. The potatoes are accordingly carried upwardly by the cups and buckets of the conveyor device 28 past a vibrator follower arm 230 which thereby settles and centers the potatoes within the cups. The cups are subsequently accurately aligned with the sectioning knife device by means of lower and upper guide rails 214 and 220 engaging the link members 188 of the conveyor belt 148 of the conveyor device 28 as the cups pass the fixed blades of the knife sectioning device 30. The sectioned potatoes as well as the potatoes contained in the buckets 180 are subsequentially spilled in the canvas chute 32 from which they are deposited on top of the delivery conveyor device 34 for delivery past the outlet 258.

It will therefore be appreciated that the machine made in accordance with this inventtion enables a large amount of different sized potatoes to be efficiently and rapidly sliced in a more accurate manner than is possible by manual sectioning and also with a tremendous savings in time and labor. It will also be observed that the novel action of the hopper device 26 into which the potatoes are deposited through the swingable gates 124 retards the downward fall of the potatoes so that they may be picked up by the cups and buckets without bruising and damage to the potatoes. Also due to the vibration imparted to the conveyor device belt and the guiding of the link members of the conveyor device 28 as the cups pass by the stationary knife blades, endows the automatic seed potato cutting machine with an unexpected high degree of reliability and efficiency.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An automatic crop seed cutting machine comprising, crop loader means, tumbling sizer means for receiving the crop therefrom and progressively depositing the crop delivered thereto into a partitioned hopper means disposed below the sizer means for segregating the crop into different size categories and retarding movement thereof, conveyor means drivingly connected to the hopper means and the sizer means including cup means and bucket means movable through the hopper means for gently receiving the segregated crop for movement thereof upwardly toward a delivery end of the conveyor means, cutter means operatively mounted relative to the conveyor means and operative to pass through the movable cup means for sectioning the crop carried therein into sections having dimensions within the size category of the crop carried by the bucket means, vibrator means operatively engageable with the conveyor means for vibration thereof to thereby center the crop within the cup means to insure uniform sectioning of the crop by the cutter means, guide means engageable with the conveyor means for aligning the cup means with the cutter means, said cup means comprising a plurality of two cut cups each having perpendicular slots therein and a plurality of one cut cups each having one slot therein disposed parallel to the direction of movement of the conveyor means, said cups being arranged on the conveyor means in accordance with size and number of sections cut by the cutter means, said hopper means comprising a downwardly inclined conveyor portion disposed beneath size segregating walls and drive means for moving the conveyor portion upwardly to thereby retard the downward movement of the crop deposited onto the conveyor portion.

2. The machine as defined in claim 1, wherein the cutter means comprises a plurality of fixed first knife blades mounted in planes disposed in the direction of movement of the conveyor means, some of the knife blades having second knife blades mounted rearwardly of the first knife blades and disposed perpendicular thereto, said knife blades being aligned with the slots in said cups for passage therethrough.

3. The machine as defined in claim 2, wherein the vibrator means comprises cam means rotatably mounted adjacent to the conveyor means and resilient follower means mounted in front of said guide means and engageable with said conveyor means in response to rotation of the cam means.

4. An automatic crop seed cutting machine comprising, crop loader means, tumbling sizer means for receiving the crop therefrom and progressively depositing the crop delivered thereto into a partitioned hopper means disposed below the sizer means for segregating the crop into different size categories and retarding movement thereof, conveyor means drivingly connected to the hopper means and the sizer means including cup means and bucket means movable through the hopper means for gently receiving the segregated crop for movement thereof upwardly toward a delivery end of the conveyor means, cutter means operatively mounted relative to the conveyor means and operative to pass through the movable cup means for sectioning the crop carried therein into sections having dimensions within the size category of the crop carried by the bucket means, said hopper means comprising a downwardly inclined conveyor portion disposed beneath size segregating walls and drive means for moving the conveyor portion upwardly to thereby retard the downward movement of the crop deposited onto the conveyor portion.

5. In a potato seed-cutting machine, a feeding hopper receiving sized potatoes and delivering them to moving cutter cups mounted on a conveyor comprising, side walls between which the sized potatoes are deposited, movable hopper bottom means disposed between said side walls and extending upwardly along one side of said side walls, a lower end of the conveyor extending into said hopper through the other side of the side walls and being embraced by the movable bottom means for confining the potatoes between the hopper and lower end of the conveyor, said hopper bottom means including a portion moved in an upward direction for receiving the potatoes thereon and retarding the downward movement thereof to thereby facilitate reception of the potatoes by the cups on the moving conveyor without bruising of the potatoes and cutter means mounted for movement through said cutter cups.

6. In combination with a gravity feeding crop sizer, a crop transferring device comprising, upwardly moving means for receiving said crop and retarding falling movement thereof, divider means mounted above the moving means separating the crop into different size categories, movable crop conveying means mounted for movement between said divider means for separately conveying each size category of the crop away from the upwardly moving means and cutter means aligned with said divider means and crop conveying means for sectioning the crop by different amounts for each size category.

7. The combination of claim 6 including vibration means operatively engageable with said crop conveying means for settling the crop therein for sectioning by the cutter means.

References Cited in the file of this patent

UNITED STATES PATENTS

| | | |
|---|---|---|
| 922,266 | Curtis | May 18, 1909 |
| 1,747,461 | Vaughan | Feb. 18, 1930 |
| 1,961,009 | Nachtigal | May 29, 1934 |
| 2,194,475 | Kurtz et al. | Mar. 26, 1940 |
| 2,552,812 | Patterson | May 15, 1951 |
| 2,703,595 | Brown | Mar. 8, 1155 |
| 2,752,967 | Sylvain | July 3, 1956 |
| 2,792,113 | Minera | May 14, 1957 |
| 2,811,997 | Schmidt et al. | Nov. 5, 1957 |
| 2,917,171 | Heald | Dec. 15, 1959 |

FOREIGN PATENTS

| | | |
|---|---|---|
| 187,063 | Switzerland | Jan. 2, 1937 |
| 226,841 | Australia | Feb. 11, 1960 |